United States Patent [19]

True

[11] 3,986,188

[45] Oct. 12, 1976

[54] DUAL MODE MICROWAVE AMPLIFIER SUBSYSTEM

[75] Inventor: Richard Brownell True, Sunnyvale, Calif.

[73] Assignee: Litton Systems, Inc., San Carlos, Calif.

[22] Filed: Sept. 9, 1974

[21] Appl. No.: 504,456

[52] U.S. Cl. ............................................. 343/18 E
[51] Int. Cl.² ........................ G01S 7/38; H04K 3/00
[58] Field of Search ............ 343/18 E, 17.1 R, 7 A, 343/16 R; 333/1

[56] References Cited
UNITED STATES PATENTS

| | | | |
|---|---|---|---|
| 2,965,898 | 12/1960 | Lewis | 343/16 R X |
| 3,265,993 | 8/1966 | Davidson et al. | 333/1 |
| 3,611,370 | 10/1971 | Frasure | 343/7 A X |
| 3,688,313 | 8/1972 | Kern | 343/7 A X |

Primary Examiner—T.H. Tubbesing
Assistant Examiner—Richard E. Berger
Attorney, Agent, or Firm—Ronald M. Goldman

[57] ABSTRACT

A dual mode electronic countermeasures subsystem includes: a turnstile junction having two pairs of waveguide inputs and a cylindrical waveguide output; quadrature couplers; continuous wave microwave energy source means for applying CW microwave energy; and pulse microwave energy source means for applying pulses of microwave energy. Power from the source is premixed by quadrature couplers and then applied to the ports of the turnstile junction wherein the output of said turnstile junction comprises either or both continuous wave microwave energy or pulse microwave energy having polarization ellipticity determined by the degree of coupling. Suitably the microwave energy source means may include traveling wave type amplifier tubes and the cylindrical waveguide output of the turnstile junction may be connected directly to a suitable radiating system.

5 Claims, 5 Drawing Figures

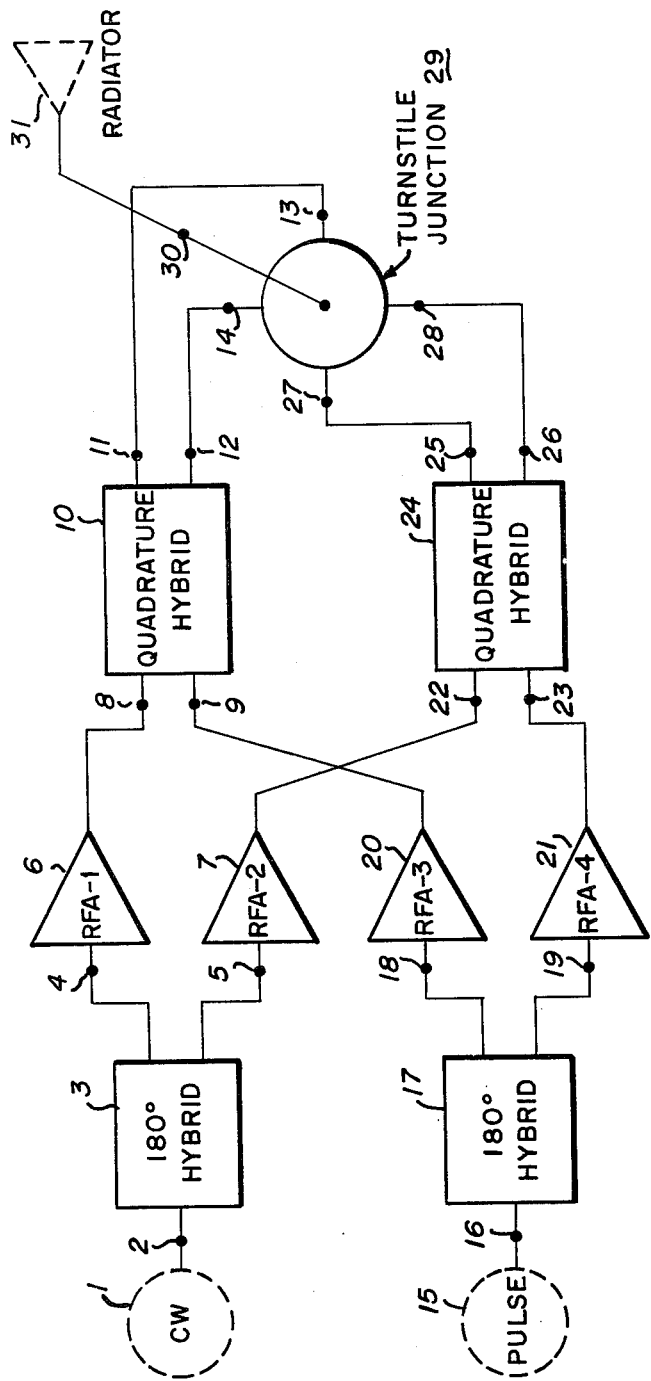
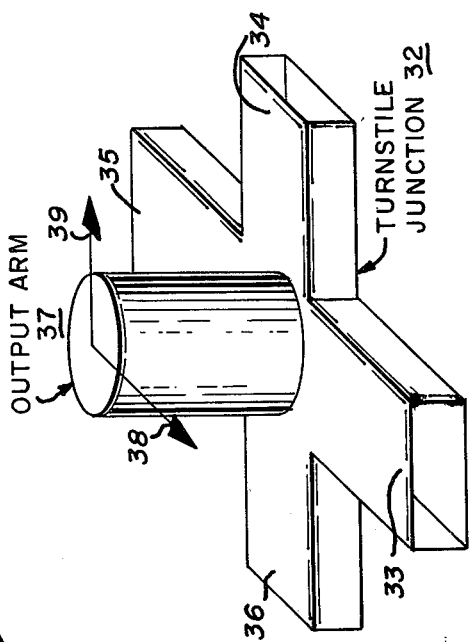
Fig._1
Fig._2

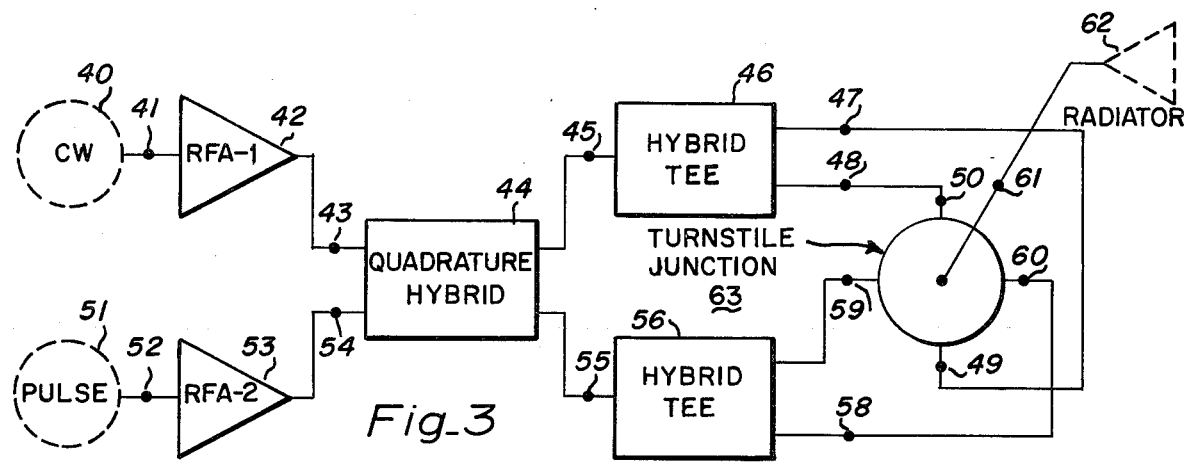
Fig_3
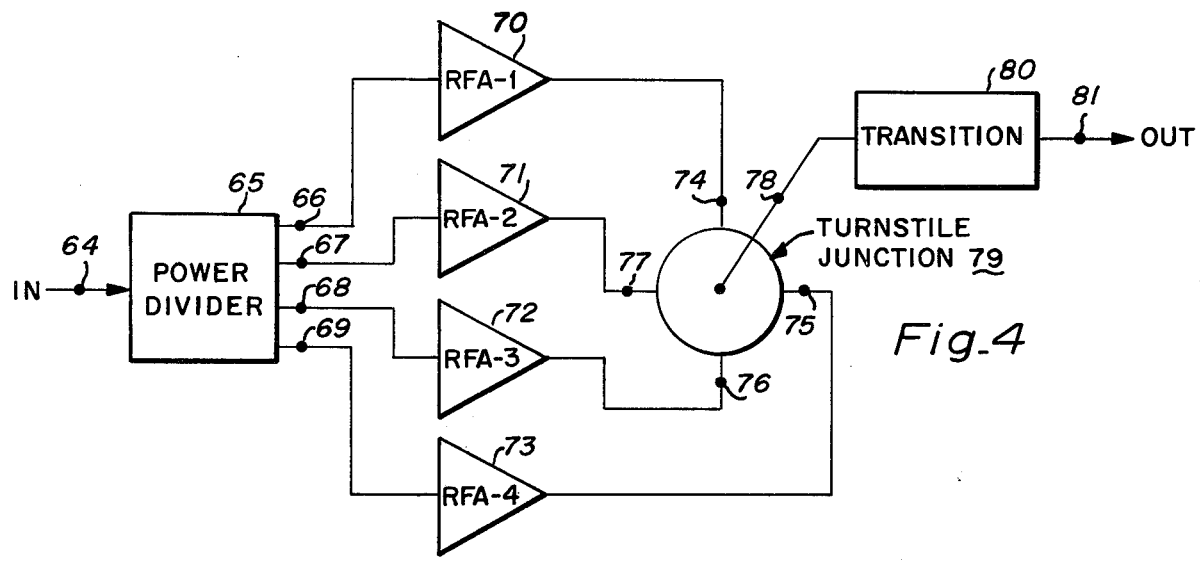
Fig_4
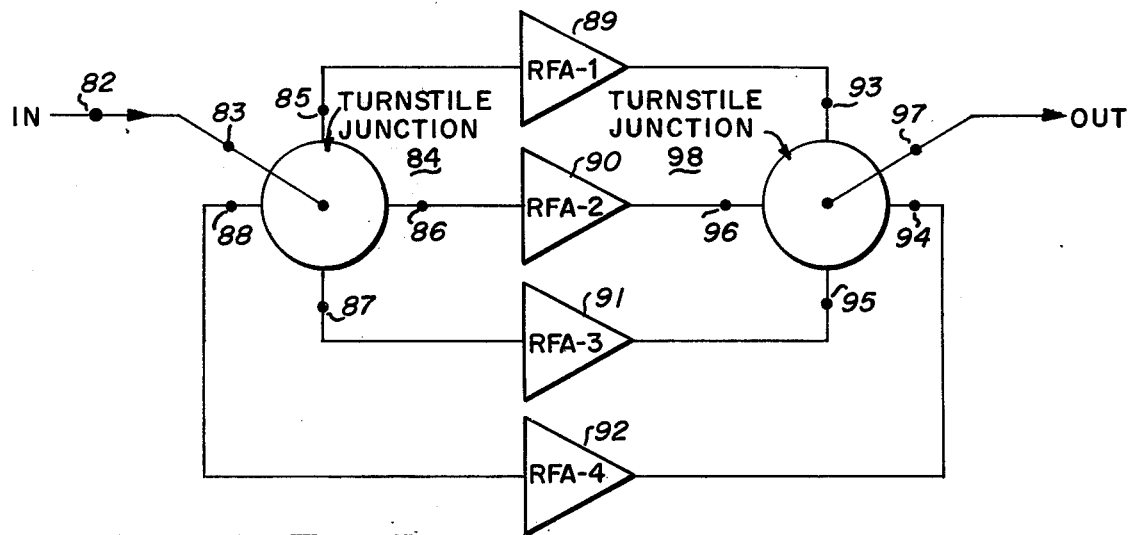
Fig_5

DUAL MODE MICROWAVE AMPLIFIER SUBSYSTEM

BACKGROUND OF THE INVENTION

1. Field of the Invention

This invention relates to microwave amplifier systems and, more particularly, to a microwave amplifier subsystem useful to provide dual mode operation in an electronic counter-measures system.

2. Description of the Prior Art

Heretofore various electronic countermeasures systems have been used for protecting aircraft by defeating or deceiving radar systems, the now conventional and well known means used to electronically detect and determine the position, altitude, etc. of flying aircraft. Present day counter-measures systems perform this function in either two ways, as has been reported in newspaper and other publicly available literature. In one, a generator of broad spectrum continuous wave microwave energy is operated which generates continuous electronic "noise". This noise is picked up by the offending radar and is added to the ambient electronic "background signals", the normal "noise", received by the radar. To detect an intruding aircraft in the normal operation of the radar, the radar transmits synchronized pulses and the operator must observe the "echo", the electromagnetic energy pulse reflected by the intruding aircraft. A high level of noise "masks" or clutters the pulses as may be relfected from such approaching aircraft and the radar is unable to detect its presence. At some position of the approaching aircraft, however, the radar echo becomes large enough in magnitude to exceed the electronically generated jamming noise and the echo is detected. At this position the approaching aircraft is electronically visible.

As is apparent, if the power level of the electronic noise source could be infinitely large, the radar system is permanently defeated and the approaching aircraft would always appear electronically "hidden". In practice the electronic noise sources are limited to state of the art power levels. Thus at some position of approach, in part depending upon the power generated by the countermeasures noise source, the approaching aircraft becomes electronically "visible" and a second countermeasures system carried by the aircraft must be placed into operation if that aircraft is to remain protected. The second electronic countermeasures equipment in the aircraft detects incidence of an electronic signal from the offending radar station and thereupon transmits a "false" echo. This false echo is sufficiently greater in power and predominates over the "real" echo. The false echo represents false information and the offending radar installation makes an incorrect determination of the position of the approaching aircraft. Thus any anti-aircraft missiles launched relying upon the radar information are misdirected. In countermeasures terminology, the operation of equipment to generate continuous noise is referred to as "CW mode" operation and the operation of such equipment to transmit false pulses is referred to frequently as the "pulse mode".

To that end a small sized lightweight countermeasures system to be carried by each individual aircraft having capability for operation in both of the aforecited "modes" of operation, sometimes referred to as "dual mode" capability, is a desirable protective device. One of the critical components of present day countermeasures equipment is the traveling wave tube, a microwave tube which amplifies microwave frequency signals. A first known approach to this requirement uses a single traveling wave tube capable of operation in both the CW mode and in the pulse mode. This approach obviously reduces weight and volume of countermeasures equipment to a minimum, however, performance is limited in regard to that desired.

A second known approach employs two traveling wave tubes: a first traveling wave tube designed for and operated in the continuous wave mode which feeds the CW energy into a second traveling wave tube. The second traveling wave tube is especially designed for two purposes: (1) to provide a high power pulse output signal when the system is placed in the pulse mode, and (2) to be electronically transparent, much as a window, to CW microwave signals from the first tube when the system is operating in the continuous wave mode. It is apparent that if the first tube in such a system fails in service, both the CW and pulse mode counter-measures capability fails, whereas if the second tube fails there may only be remaining the CW mode counter-measures capability.

A third method uses pulse and continuous wave traveling wave tubes followed by a hybrid junction to combine power. Disadvantages in this approach include the fact that if a single antenna is to be driven, roughly one-half of the power is lost in the combiner, or if fore and aft antennas are driven by the two hybrid output ports, phase will necessarily be dissimilar in the antennas depending on the mode of operation.

SUMMARY OF THE INVENTION

Accordingly, it is an object of my invention to provide a novel microwave countermeasures system capable of dual mode operation.

It is a further object of my invention to provide an improved countermeasures system in which failure of the continuous wave amplifier section does not result in the failure of the pulse amplifier section and vice versa.

And it is a still additional object of my invention to provide an electronic countermeasures system capable of dual mode operation using microwave amplifiers of standard design and which is effective against radars having polarization of arbitrary orientation and type.

In accordance with the foregoing objects, I employ in a dual mode electronic countermeasures system a five port device, known as a turnstile junction, which contains two pairs of co-planar waveguide inputs and a cylindrical waveguide output oriented perpendicular to the two pairs of rectangular waveguide inputs. In this device, microwave energy applied to either said pair of inputs at equal power levels and 180° out of phase, propagates out the circular waveguide. Said microwave energy may be CW or pulsed or a combination or superposition of both.

In the preferred embodiment, said CW and pulsed signals are combined or premixed with quadrature couplers prior to application to the co-planar waveguide inputs of the turnstile junction. If said quadrature couplers are of the 3 db type, CW and pulsed microwave power is distributed equally among co-planar ports whereupon the 90° phase shift between each port produces circularly polarized waves in the circular output waveguide. A reduction in coupling from 3 db results in waves polarized elliptically. As coupling is reduced to zero, waves in the output waveguide are linearly polarized and no quadrature couplers are required. Energy in the circular output waveguide is thence broadcast into space via a suitable radiating system such as a horn antenna steerable reflector arrangement for instance.

Although the circularly polarized component in the CW mode is of opposite helicity from that in the pulse mode, and the orientation of the linearly polarized components in the CW and pulse modes are at right angles, the elliptically polarized radiation broadcast is sufficient to effectively defeat all but the most sophisticated of radar systems.

The foregoing objects of my invention as well as additional objects and advantages of my invention, as well as the nature of the elements comprising my invention and their functional cooperation, are better understood by giving consideration to the detailed description of the various embodiments of the invention which follows, taken together with the figures of the drawings.

BRIEF DESCRIPTION OF DRAWINGS

In the drawings:

FIG. 1 illustrates in block diagram form a first embodiment of my invention;

FIG. 2 illustrates the geometry of a turnstile junction power combiner employed in the foregoing embodiment of my invention;

FIG. 3 illustrates in block diagram form a second embodiment of the dual mode subsystem of my invention;

FIG. 4 illustrates another power combining application of the turnstile combiner of my invention; and FIG. 5 illustrates in block diagram form still another application employing the turnstile power combiner.

DESCRIPTION OF THE PREFERRED EMBODIMENTS

The embodiment of FIG. 1 includes a first source of microwave energy, 1, which provides continuous wave microwave energy connected via input 2 to a hybrid power splitter, 3, having two outputs, 4 and 5, a pair of similar continuous wave (CW) microwave amplifiers, 6 and 7, having an input connected to splitter outputs 4 and 5, respectively. A second source of microwave energy, 15, is included which provides pulse microwave energy. A second hybrid 17, having two outputs, is connected by its input 2 to source 15. A pair of pulsed microwave amplifiers, 20 and 21, have respective inputs connected to respective splitter outputs, 18 and 19. A pair of quadrature couplers or hybrids, 10 and 24, are provided. Hybrid 10 has two inputs, 8 and 9, and two outputs, 11 and 12. Hybrid 24 has two inputs, 22 and 23, and two outputs, 25 and 26. A turnstile junction, 29, includes two opposed inputs, 14 and 28, and a second pair of opposed inputs, 13 and 27, and an output 30. Output 30 is connected to an antenna, 31, or other equipment.

The symbolically illustrated sources, 1 and 15, are conventional sources of microwave signals and may comprise signal sources from any microwave system. Typically in a countermeasures system the CW signal is comprised of uncorrelated noise whereas the pulsed signal represents an electronically processed target echo which causes erroneous information to be registered by the offending radar. Note that these signals may originate in a single driver amplifier chain and may be applied selectively to points 2 or 16 depending on the mode of operation by actuation or deactivation of an electronic switch.

The 180° hybrid power splitters, 3 and 17, in the embodiment of FIG. 1 represent standard elements available from numerous manufacturers of electronic components.

The microwave amplifiers, previously referred to, may comprise traveling wave tubes. Such devices are well-known amplifiers of microwave frequency signals. One typical type utilizes the interaction between a microwave signal propagating along a helix and an electron beam directed through the center of the helix which takes energy from the electron beam and exchanges it or converts it to the high frequency energy to thereby amplify the input microwave signal. For further reference to the details of construction of this and other types of traveling wave tubes, the reader is referred to the literature, including patents.

Hence, traveling wave tubes 6 and 7 may be such helix type CW traveling wave tubes optimally designed for amplifying high frequency signals. Traveling wave tubes 20 and 21, on the other hand, may be helix type pulsed traveling wave tubes especially designed for amplification of continuous wave signals. The pulsed and continuous wave traveling wave tubes can each be designed for optimum DC to microwave power conversion efficiency and such that amplifier gain is similar in each tube.

Nominally in the preferred example, traveling wave tubes 6 and 7, and traveling wave tubes 20 and 21, are selected so as to operate over the same frequency band, although it is conceivable in other embodiments to have said pairs operate over different frequency bands. Examples of a suitable tube for the pulse mode is the L-5126-50 manufactured by Litton Industries, Electron Tube Division, San Carlos, California, rated at 1000 watts. Similarly, a suitable CW helix type traveling wave tube is the L-5280, also manufactured by Litton Industries, Electron Tube Division, rated at 200 watts.

Moreover as is conventional, suitable sources of electrical power or power supplies are necessarily connected to the various traveling wave tubes to place them in operation. These power supplies are not illustrated since they are well understood and do not contribute to the description of the invention.

The quadrature hybrids are standard components obtainable from various manufacturers and are available in coaxial or waveguide construction. In a standard 3 db quadrature hybrid, microwave power entering port 8 will be divided or "split" appearing in ports 11 and 12 at equal levels and signal 12 advanced by 90 electrical degrees from that in 11. Likewise, a signal applied to port 9 is split between ports 11 and 12. However signal 11 is advanced in phase by 90° from that in 12.

It has been pointed out that by use of other quadrature coupling elements such as directional couplers having less than 3 db of coupling, the unequal power levels at output ports 11 and 12 give rise to elliptical polarization in the output waveguide. If the coupling is zero, the quadrature couplers 10 and 24 are each equivalent to and become two transmission lines, one line between input 8 to output 11, another between input 9 and output 12 for coupler 10; and input 22 to output 25, and input 23 to output 26 for coupler 24. And that structure is an aspect of the invention.

The turnstile junction is illustrated in perspective in FIG. 2. As is apparent, this device is conventional in structure.

Turnstile junction 32 includes two pairs of waveguide input arms, inputs 33 and 35, which make up one pair of the inputs, and inputs 34 and 36, which make up the second pair of inputs. The turnstile junction contains an output arm 37. The turnstile junction is a known passive device, hence it is simply symbolically illustrated. Physically the junction contains two pairs of perpendicular and co-planar input arms and a circular waveguide output oriented perpendicular to the plane formed by the four input arms. More rigorously it is a symmetrical six port device comprising four rectangular waveguides operating in the $TE_{10}$ mode and forming a "cross" in the H-plane, and a circular waveguide operating in the $TE_{11}$ mode whose axis is perpendicular to the plane of the "cross".

The turnstile junction has the peculiar and unique electrical property of providing an output from its circular output arm in response to two equal and oppositely phased signals being applied to one pair of input arms without interacting or providing passage of those signals to the remaining pair of inputs. Likewise equal and oppositely phased microwave energy signals applied across the inputs of the remaining pair do not emerge at the inputs of the first pair, but instead pass through the output arm. Such signals applied to ports 33 and 35 give rise to a linearly polarized wave in output arm 37, the direction of polarization indicated schematically as 38. In a similar fashion, input signals applied to ports 34 and 36 appear in the output waveguide having the polarization vector oriented in direction 39.

The design details of the conventional turnstile junction are not here further described since they are adequately described in the literature. For such details the reader may make reference to Altman, *Microwave Circuits*, D. Van Nostrand, 1964, pp. 126–133; Smullin and Montgomery, *Microwave Duplexers*, McGraw-Hill, 1948, pp. 372–375; Meyer and Goldberg, IRE Trans. MTT, Vol. MTT3, No. 6, pp. 40–55, December 1955.

In the operation of this embodiment the CW microwave energy applied to hybrid 3 is divided into two parts, one portion of which is applied to amplifier 6 and the remaining portion to amplifier 7. The amplified signal from amplifier 6 is applied to one input of quadrature hybrid 10 and the amplified output of amplifier 7 is applied to the input of the other quadrature hybrid 24. Similarly, the output of source 15 is applied to the input of hybrid 17, and is divided into two output signals, one of which is applied to the input of amplifier 20 and the other portion of which is applied to the input of amplifier 21. The output of amplifier 20 is coupled to the remaining input of quadrature hybrid 10, and the amplifier signal from amplifier 21 is coupled to the remaining input quadrature hybrid 24.

The signal from sources 1 and 15 thus eventually appear at all four inputs of turnstile junction 29. Phasing of said signals is such that the microwave energy is recombined in the turnstile junction, appearing exclusively after said recombination in the circular output waveguide of the turnstile, 30, in the form of circularly polarized waves. Said energy thence propagates to the radiating system, 31, where it is broadcast into space.

Where the quadrature couplers 10 and 24 have zero coupling and in essence are two transmission lines, the energy from CW source 1 passes between 8 and 11 to arm 13 at 0° and between 22 and 25 to arm 27 at 180°. And in like manner the energy from pulse source 15 as may be amplified passes between 9 and 12 to arm 14 at 0° and between 23 and 26 to arm 28 at 180°, and the resultant signal appears at output 30.

The various microwave components heretofore described are available with octave of greater bandwidths excepting the turnstile junction. Broadbanding of the turnstile junction includes use of ridged rectangular and circular waveguide, and necessary tuning structures.

The salient advantages of the invention may be summarized: Firstly, the microwave amplifier tubes of proven design may be employed and these can be tailored to meet the numerous specific system requirements, such as high efficiency, broad bandwidth, multiple signal capability, similar or matched gain in CW and pulsed type tubes, low second harmonic power, and good overdrive characteristics. Moreover the CW traveling wave tubes can be ungridded for better beam optics which enables both higher efficiency and higher possible output power. These features are desired in "dual mode" systems.

Secondly, the invention provides increased system reliability since failure of one tube does not completely disable the system and heat is better distributed. Furthermore, a system having a full 10 db pulse-up ratio or greater can be achieved by choice of the traveling wave tube amplifiers. The barrage jamming mode may occur concurrently while transmitting pulsed signals, or the pulsed signal may be fed into the CW line and phasing arranged for constructive interference resulting in an increase in available pulsed signal power.

Variations of my invention are hereinafter considered in connection with the different embodiments set forth in FIGS. 3, 4 and 5.

The embodiment of FIG. 3 includes a source 40 of continuous wave microwave energy. The output of source 40 is connected to input 41 of microwave amplifier 42. A second source of microwave energy 51 is symbolically illustrated and is of the type which provides pulsed microwave energy. Source 51 is connected to the input 52 of microwave amplifier 53. The outputs of amplifiers 42 and 53 are connected to the respective inputs of a quadrature hybrid or coupler 44. One of the outputs of the quadrature hybrid is connected to the input 45 of a first hybrid or magic tee 46, and the remaining output of hybrid coupler 44 is connected to input 55 of a second hybrid tee 56. The two outputs, 46 and 48, of magic tee 46 are coupled to the opposed input arms 49 and 50, respectively, of turnstile junction 63. The two outputs 57 and 58 of hybrid tee 56 are connected to a respective one of remaining opposed input arms 59 and 60, respectively, of turnstile junction 63. The output 61 of the turnstile junction may be coupled to a suitable radiating system 62 or to other electronic equipment utilizing the signal.

Components in this embodiment corresponding to those of FIG. 1 are not discussed in detail. The embodiment of FIG. 3 does, however, include hybrid tees.

The hybrid tee or magic tee junction is a well-known four port passive component constructed of various waveguides which is adequately described in the scientific literature and hence is simply symbolically illustrated in the drawings. This junction includes a pair of co-planar output arms or ports which in FIG. 3 hybrid tee 46 correspond to outputs 47 and 48, and a third arm or port geometrically oriented perpendicular to the two co-planar arms. The third perpendicular arm corresponds to arm 45 in the embodiment of FIG. 3. The usefulness of the magic tee junction is that a microwave signal applied at input 45 is divided between each of the two output arms 47 and 48 and places those signals as appear at the output arm, 180° out of electrical phase. For further detailed information on this microwave component, the reader is referred to the literature including: Altman, *Microwave Circuits*, D. Van Nostrand, 1964, pp 60–71.

In operation, CW signals from source 40 are amplified in amplifier 42 and applied to quadrature hybrid 44 which divides the output of 42 between the respective outputs of the quadrature coupler so that approximately equal signals are applied to the inputs of the hybrid tees, 46 and 56. Hybrid tee 46 divides its input signal into two equal and oppositely phased signals which are applied to the respective inputs 49 and 50 of turnstile junction 63. Due to the inherent mode of operation of the passive component 63, the input signals are translated into a signal at output 61, the circular waveguide output of turnstile junction 63. Likewise, the other portion of the energy from amplifier 42 appears at port 55 having a phasing of 90°. This is subsequently split by hybrid tee 56 into two equal signals of phase 90° and 270°. These signals are applied to ports 59 and 60 of the turnstile junction which are translated into a signal at turnstile output 61. As one linearly polarized wave in the circular output waveguide is delayed by 90° from the linearly polarized wave in the perpendicular direction, clearly upon superposition of these components a circularly polarized wave exists in the output circular waveguide 61.

Pulsed signals from source 51 are amplified, split and recombined in the turnstile junction in a fashion the same as that described above with the exception of phase relationships which results in an oppositeness of helicity of the circularly polarized wave in the output waveguide. Again, by reduction of coupling from 3 db in the quadrature coupler 44, elliptically polarized fields are caused to exist in the output waveguide 61.

From the foregoing illustration of FIG. 3 it is apparent that should one of the traveling wave tubes fail, one portion of the system becomes inoperative; that is, if traveling wave tube 53 fails then the pulse mode of the countermeasures system fails. However failure of tube 53 does not in any way affect the operation of traveling wave tube 42 or the operation of the continuous wave mode of the countermeasures system. The reverse is likewise true in the event of failure of traveling wave tube 42. Accordingly, what is derived is a dual mode system capable of operation in both a continuous wave and a pulse mode with enhanced reliability and with simple conventional and easy to construct components.

The two-tube approach shown in FIG. 3 offers a savings in weight; however, it is necessarily less powerful than the four-tube system of FIG. 1.

The traveling wave tubes, 42 and 53, may be of the conventional coupled cavity type. The coupled cavity type traveling wave tube is known to have a relatively narrow amplification bandwidth in contrast to helix type traveling wave tubes, although the former are capable of delivering substantially greater output power levels. Accordingly, the first traveling wave tube 42 may be optimized for operation over one portion of a band of frequencies, such as $F_o$ to $F_o+\Delta$, while the second traveling wave tube, 53, may be optimized for providing broadband operation over a range of frequencies $F_o-\Delta$ to $F_o$. Accordingly with both amplifiers in simultaneous operation input signals over the range of frequencies of $F_o-\Delta$ to $F_o+\Delta$ are uniformly amplified.

As is evident from the cited literature references, although the turnstile junction has been applied to various combinations in microwave systems, it heretofore has been overlooked, if not indeed disregarded, as a suitable means to combine microwave energy in effect to combine the outputs of various microwave sources while avoiding many of the difficulties inherent in past methods of paralleling microwave amplifier tubes having different performance characteristics.

The turnstile junction may be made use of two combine microwave power from a set of similar RF amplifiers. Two embodiments are depicted schematically in FIGS. 4 and 5.

The embodiment of FIG. 4 includes a power divider 65 having an input 64 adapted for connection to a source of microwave energy, not illustrated, and four outputs 66, 67, 68 and 69. Four conventional traveling wave tubes are provided including traveling wave tube 70, 71, 72 and 73. The inputs of traveling wave tubes 70, 71, 72 and 73 are connected to the respective ones of the outputs 66, 67, 68 and 69 of the power divider. A turnstile junction 79 contains an output port 78, a first pair of oppositely located input arms or ports 75 and 77, and a second pair of oppositely located input arms 74 and 76. The output of tube 70 is connected to input 74; the output of tube 71 to input 77; the output of tube 72 to input 76; and the output of tube 73 to input 75. The output port 78 of the turnstile junction is connected to the input of a circular waveguide-to-rectangular transition 80, a conventional device available from various manufacturers of waveguide components. The output of the transition 81 is connected to other equipment which is not illustrated. As previously explained the elements are all of conventional structure and have been described generally in connection with the preceding embodiments.

In operation, microwave energy applied at input 64 is split into four equal portions by power divider 65. The signal which appears at output ports 66 through 69 is then applied to the respective inputs of, and amplified by, traveling wave tubes 70 through 73. Output power from each of the said traveling wave tubes is then delivered to the four input ports 74 through 77 of the turnstile junction 79. Considering that the phasing of the signal at port 74 is 0°, the phasing of the other signals are respectively: 180° for port 76, 0° for port 77, and 180° for port 75. Such phasing is either provided by the power splitter, achieved by the inclusion of phase shifters between the power divider output ports 66 through 69 and the input ports of traveling wave tubes 70 through 73, or by a power splitter comprised of three 180° hybrids. Unequal line lengths from the power splitter outputs to the traveling wave tubes may also be employed, however, this technique is only useful over a limited frequency range as the amount of phase shift varies with frequency in this case.

When the four ports of the turnstile junction 79 are driven with equal amplitude signals and each co-linear pair is driven at 0° and 180°, respectively, all of the power will emerge from the circular output waveguide 78 and the polarization vector will be oriented in a direction which is the vector sum of components 38 and 39 in FIG. 2, or 45° between them in this case. The circular waveguide-to-rectangular transition 80 oriented perpendicularly to the resultant vector thus completes the combiner. Functioning of the parallel amplifier causes a magnified reproduction of tghe signal applied to input port 64 to appear at output port 81.

The turnstile power combiner has advantages over other power combining schemes such as size, weight, and insertion loss. It appears to be relatively simple in construction so that it should be inexpensive to reproduce. As the power combiner is a passive device, it should be most reliable.

Still another embodiment of the invention is illustrated symbolically in FIG. 5. In this, two turnstile junctions are employed, 84 and 98. As illustrated, the first turnstile contains four co-planar arms 85, 86, 87 and 88; with arms 86 and 88 forming one opposed pair of arms, and arms 85 and 87 forming the other pair of opposed arms; and includes the cylindrical arm 83. The second turnstile junction likewise has four co-planar arms 94, 95, 96 and 93, arranged into two pairs of arms, and an output 97. Four microwave amplifiers, suitably traveling wave tubes, 89, 90, 91 and 92, are included, and traveling wave tube 89 has an input connected to turnstile arm 85; tube 90 has an input connected to arm 86; tube 91 has an input connected to arm 87; and tube 92 has an input connected to arm 88. The outputs of tubes 89, 90, 91 and 92 are connected respectively to input arms 93, 96, 95 and 94 of turnstile junction 98. Microwave signals are delivered to the circular input waveguide 83 of the first turnstile junction and the output arm 97 may be connected to a radiating system, or other equipment, not illustrated.

In operation, microwave signals flowing into turnstile junction 84 are split into portions, where the relative amplitude and phasing of the signals which emerge from co-linear port pairs are equal and of 0°and 180° phase, but where the relative amplitude and phasing between adjacent pairs is proportional to the decomposition of the incoming signal into mutually orthogonal components parallel to directions 38 and 39 in FIG. 2.

The output signals from turnstile junction 84 propagate to their input of traveling wave tubes 89, 90, 91 and 92, where they are amplified. Subsequent to the amplification, said signals enter the input ports 93, 94, 95 and 96 of the output turnstile junction 98. Here they are recombined and in the circular output waveguide 97, a magnified replica of the original input signal exists. Clearly, the parallel amplifier of FIG. 5 has the unique property that an input signal of arbitrary polarization will be magnified and reproduced at the output. By exchanging one pair of feed arms to the outside turnstile, rotation can be reversed if this is required.

Consider a simple system consisting of a receiving horn, input turnstile junction, four CW mini-traveling wave tubes, output turnstile, and broadcast horn. Such a system could function usefully in repeater applications or as electronic chaff generator. Furthermore, subsystems including suitable electronic processing in the chain might be mounted about an aircraft forming an effective protective shield for the aircraft. Note that a reduction in signal processing equipment by a factor of 2 is possible by combining signals from turnstile junction 84 port pairs using 180° hybrids, and re-dividing the power using 180° hybrids subsequent to signal processing for input to traveling wave tubes 89, 90, 91 and 92.

Other higher order configurations are possible employing the turnstile junction such as the paralleling of sixteen tubes employing an input quad of magic tees arranged in a Butler matrix configuration followed by four parallel amplifiers as shown in FIG. 4, followed by another Butler matrix quad of magic tees. Such an arrangement enables four-port switchability and a substantial reduction in the number of necessary waveguide junctions.

Although ECM use has been emphasized in this discourse, suitably there are radar applications which can make use of the power combining principles set forth herein. Such applications include, for example, monopulse radar systems with polarization diversity achieved by electronic phase shift control before the output tubes connected to the set of turnstiles which comprise the primary radiator.

Reference is again made to the embodiment of FIG. 1. As was noted earlier, the quadrature hybrid or couplers, 10 and 24, are of the standard type providing 3 db coupling. Thus with respect to coupler 10, a signal applied at 8 will appear at outputs 11 and 12 with essentially equal power levels. As was also described earlier, should the couplers 10 and 24 be designed to have zero coupling the resultant structure performs simply as two transmission lines and may in fact be replaced by two separate transmission lines, one located between the point 8 and 11 and the other located between the points 9 and 12. The same is true for coupler 24 between its input 22 and its output 25, its input 23 and its output 26. With that structure or zero coupling in the quadrature couplers 10 and 24, the CW microwave energy applied at input 8 passes through the coupler to output 11 and is applied to input arm 13 of the turnstile junction 29 at substantially 0° reference phase. The CW microwave energy applied at input 22, which as is recalled is 180°out of phase with that at input 8 due to the action of the 180° hybrid coupler 3, passes through coupler 24 to output 25 and from there to input arm 27, which is opposed to input arm 13, and is at a 180° phase shift from that at arm 13. In this form it is seen that the CW microwave energy is applied only to two of the arms of the turnstile junction. In like manner the pulse microwave energy applied at input 9 of quadrature hybrid 10 passes through to output 12 and from there into the input arm 14 at a reference zero phase and the pulse energy applied at input 23 passes through quadrature coupler 24 to output 26 and from there to the input arm 28 opposed to input arm 14. The CW and pulse microwave energy as separately applied to opposed arms of the turnstile junction are combined and appear in the output arm 30 and from there are coupled to a suitable radiating means 31.

It is believed that the foregoing detailed description of the preferred embodiments of my invention are sufficient to enable one skilled in the art to make and use the invention. However it is expressly understood that my invention is not to be limited to those details inasmuch as numerous substitutions or modifications become apparent to those skilled in the art upon reading this specification. Thus for example I have described traveling wave tubes as the microwave amplifiers of the preferred embodiments. However one may substitute an equivalent microwave amplifier of some other type, such as a crossed field amplifier. Accordingly my invention is to be broadly construed to include all equivalents and substitutions within the full spirit and scope of the appended claims.

What I claim is:

1. In an electronic countermeasures system of the type which broadcasts one or more kinds of microwave signals for rendering ineffective radar detection systems receiving such signals, the combination comprising:

a turnstile junction, said turnstile junction of the type having an output arm and first, second, third, and fourth input arms arranged into two pairs of arms with the arms in the pair oriented facing one another and with said output arm oriented orthogonal to said input arms;

first coupling means for applying microwave frequency energy to said first input arm;

second coupling means for applying microwave frequency energy to said second input arm;

third coupling means for applying microwave energy to said third input arm; and fourth coupling means for applying microwave energy to said fourth arm; and output means coupled to the output arm thereof for propagating microwave energy therefrom;

a quadrature coupler having first and second inputs and first and second outputs for dividing microwave energy applied to each input between said outputs;

a first hybrid T having an input and two outputs;

a second hybrid T having a first input and two outputs;

means for coupling the first output of said quadrature coupler to the input of said first hybrid T;

means for connecting the second output of said quadrature coupler to the input of said second hybrid T;

means for connecting the first output of said first hybrid T to said third coupling means;

means for connecting the second output of said first hybrid T to said first coupling means;

means for connecting the first output of said second hybrid T to said fourth coupling means; and means for connecting the second output of said second hybrid T to said second coupling means;

first continuous wave microwave energy source means for producing CW microwave signals at an output; second separate pulsed microwave energy source means for producing pulsed microwaave signals at an output; means coupling the output of said first source means to one input of said quadrature coupler; and means coupling the output of said second source means to the other input of said quadrature coupler.

2. In an electronics countermeasures system of the type which broadcasts one or more kinds of microwave signals for rendering ineffective radar detection systems receiving such signals, the combination comprising:

a turnstile junction, said turnstile junction of the type having an output arm and first, second, third, and fourth input arms arranged into two pairs of arms with the arms in the pair oriented facing one another and with said output arm oriented orthogonal to said input arms;

first coupling means for applying microwave frequency energy to said first input arm;

second coupling means for applying microwave frequency energy to said second input arm;

third coupling means for applying microwave energy to said third input arm; and fourth coupling means for applying microwave energy to said fourth arm; and output means coupled to the output arm thereof for propagating microwave energy therefrom;

a first hybrid junction having an input and first and second outputs;

a second hybrid junction having an input and first and second outputs;

a first quadrature coupler having first and second inputs and first and second outputs for dividing microwave energy applied to each input between said outputs;

a second quadrature coupler having first and second inputs and first and second outputs for dividing microwave energy applied to each input between said outputs;

means coupling said first output of said first hybrid to said first input of said first quadrature coupler;

means coupling said second output of said first hybrid to said first input of said second quadrature coupler;

means coupling said first output of said second hybrid to said second input of said first quadrature coupler;

means coupling said second output of said second hybrid to said second input of said second quadrative coupler;

means connecting said first output of said first quadrature coupler to said first coupling means;

means connecting said second output of said first quadrature coupler to said second coupling means;

means connecting said first output of said second quadrature coupler to said third coupling means; and means connecting said second output of said second quadrature coupler to said fourth coupling means;

first and second separate microwave energy source means;

said first source means coupled to said first hybrid junction for providing CW microwave energy to the input of said first hybrid junction; and said second source means coupled to said second hybrid junction for providing pulsed microwave energy to said input of said second hybrid junction.

3. The invention as defined in claim 2 wherein each of said first, second, third and fourth coupling means between said hybrid outputs and the inputs of said quadrature couplers further include microwave amplifier means.

4. In an electronic countermeasures system, the combination including:

a turnstile junction, said turnstile junction having four input arms arranged into two pairs of opposed arms, with the first and the third arms forming a first pair and the second and the fourth arms forming a second pair, and an output arm oriented orthogonal to each of said input arms;

first means for applying pulsed microwave energy signals to said first and third input arms in substantially equal level and substantially 180°out of phase;

second means for applying continuous wave microwave energy signals to said second and fourth input arms in substantially equal level and substantially 180° out of phase;

means coupled to said output arm for transmitting microwave energy therefrom.

5. An electronic countermeasures system comprising:

a first source of CW microwave energy;

a hybrid for receiving CW microwave energy at its input and dividing said microwave energy between a first and second output;

a second source of pulsed microwave energy; said second source being separate from said first source;

a second hybrid for receiving pulsed microwave energy at its input and dividing said energy between a first and second output;

first and second CW microwave amplifiers having inputs and outputs;

third and fourth pulse microwave amplifiers each having an input and output;

a first quadrature coupler having a pair of inputs and a pair of outputs;

a second quadrature coupler having a pair of inputs and a pair of outputs;

means for coupling said first amplifier input to a first output of said first hybrid and for connecting the output thereof to a first input of said first quadrature coupler;

means connecting the input of said second microwave amplifier to the second output of said first hybrid and the output thereof to a first input of said second quadrature coupler;

means for connecting the input of said third microwave amplifier to the first output of said second hybrid and the output thereof to the remaining input of said first quadrature coupler;

means for connecting the input of said fourth microwave amplifier to the second output of said second hybrid and the output thereof to the remaining input of said second quadrature coupler;

a turnstile junction having a cylindrical output port and two pairs of opposed arms;

means connecting the first output of said first quadrature coupler to one of said input arms;

means connecting the second output of said first quadrature coupler to an adjacent arm;

means connecting the first output of said second quadrature coupler to the still next adjacent input arm; and means connecting the second output of said second quadrature coupler to the last remaining input arm; and means coupled to said output arm for radiating microwave energy derived therefrom.

* * * * *